Oct. 28, 1947.  C. E. JAHNIG  2,429,721
CONTACTING GASES AND SOLIDS IN A FLUIDIZED SYSTEM
Filed Jan. 28, 1944  3 Sheets-Sheet 1
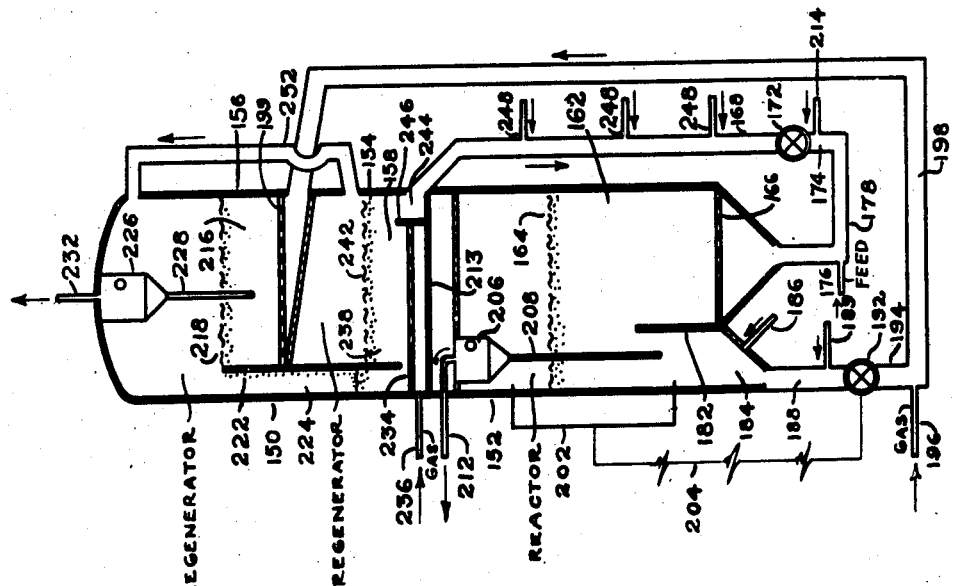
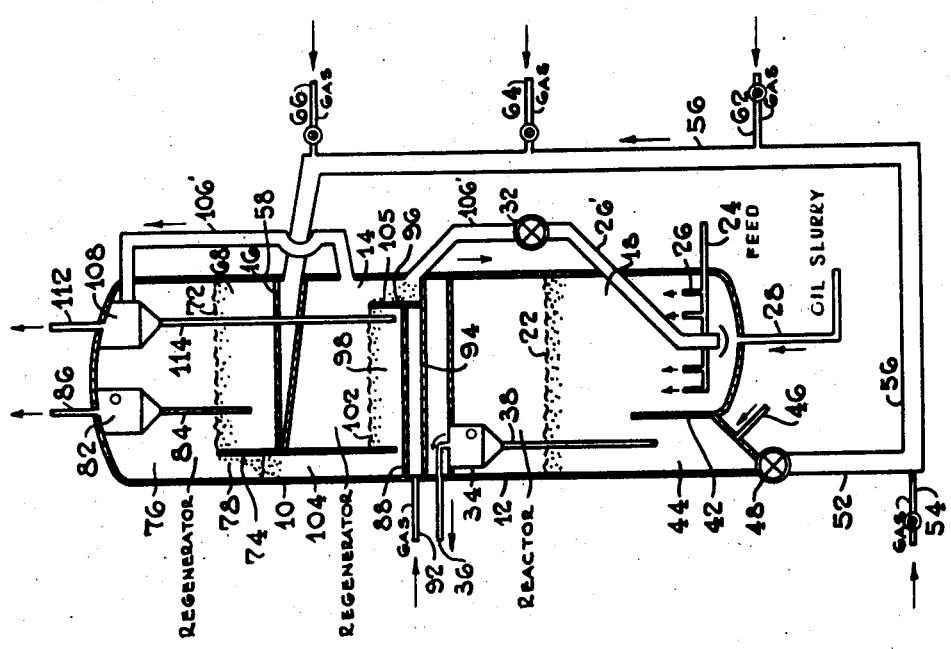
Charles E. Jahnig  Inventor
By _____ Attorney Oct. 28, 1947.        C. E. JAHNIG        2,429,721
CONTACTING GASES AND SOLIDS IN A FLUIDIZED SYSTEM
Filed Jan. 28, 1944        3 Sheets-Sheet 2
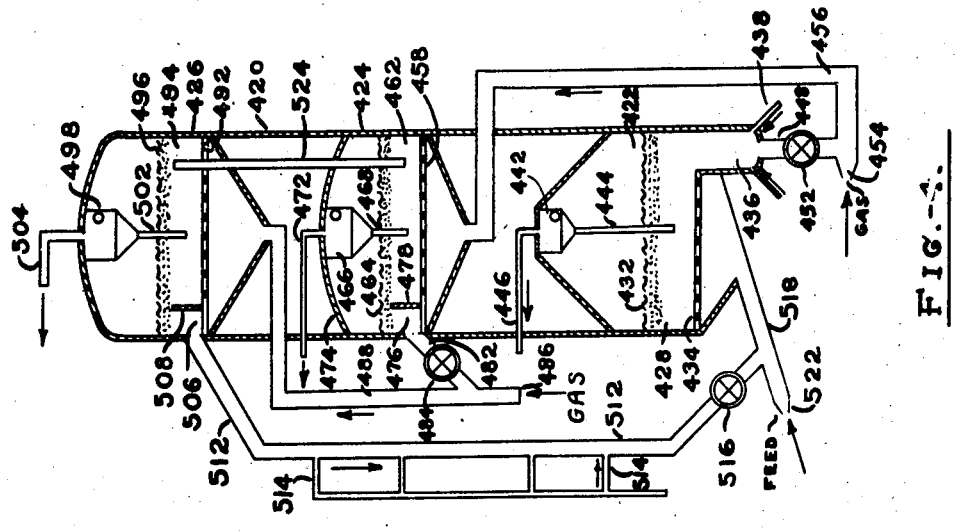
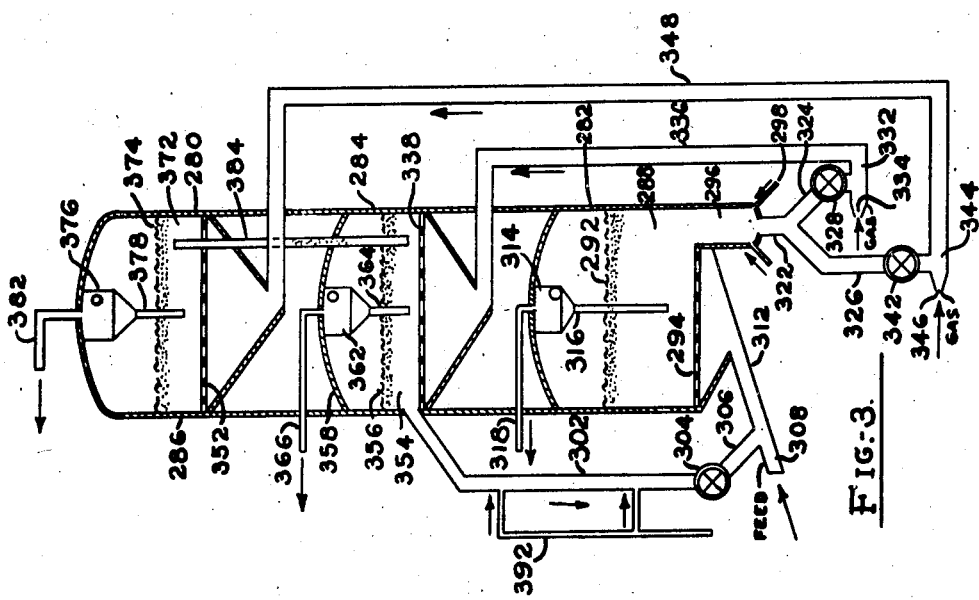
Charles E. Jahnig  Inventor
By _P. H. Young_ Attorney Oct. 28, 1947.  C. E. JAHNIG  2,429,721
CONTACTING GASES AND SOLIDS IN A FLUIDIZED SYSTEM
Filed Jan. 28, 1944  3 Sheets-Sheet 3
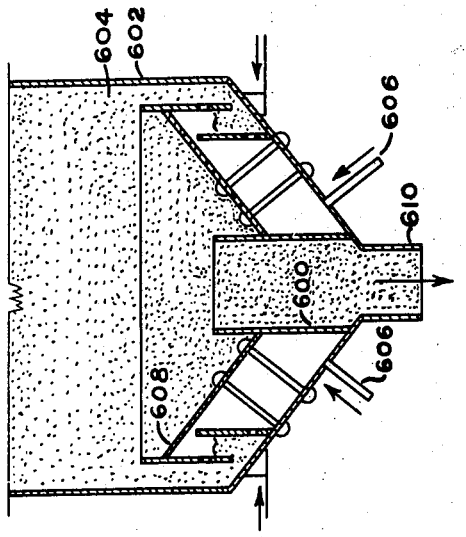
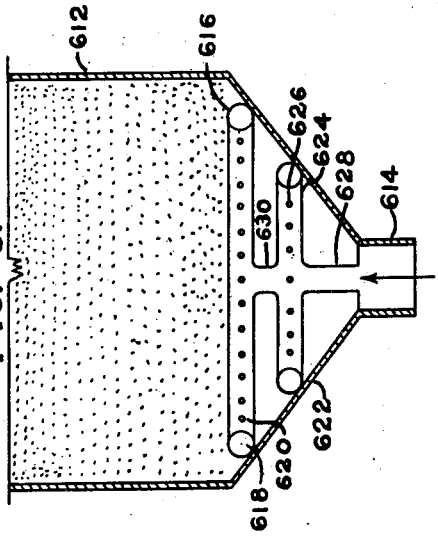
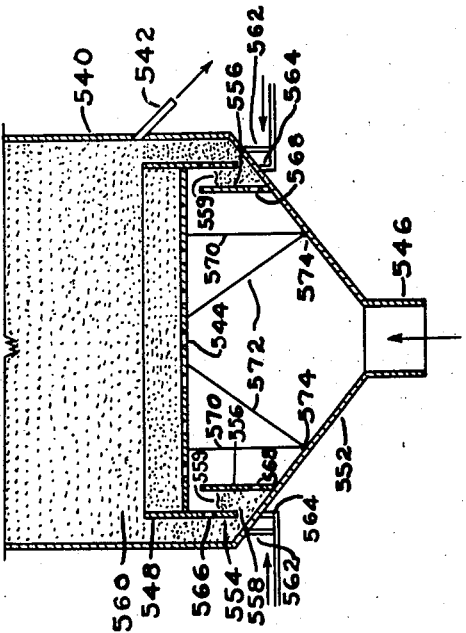
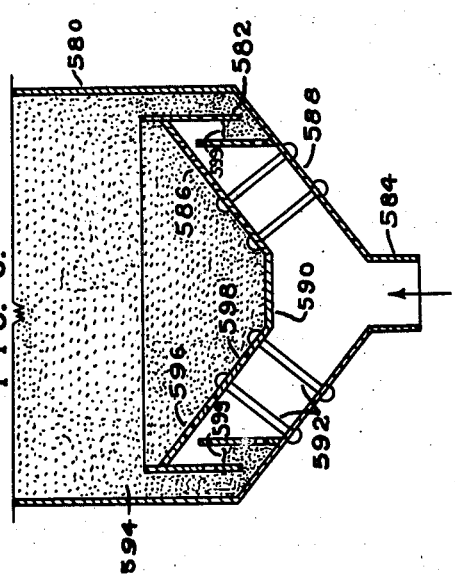
Charles E. Jahnig  Inventor
By _____ Attorney Patented Oct. 28, 1947

2,429,721

UNITED STATES PATENT OFFICE 2,429,721

CONTACTING GASES AND SOLIDS IN FLUIDIZED SYSTEMS

Charles E. Jahnig, Roselle, N. J., assignor to Standard Oil Development Company, a corporation of Delaware Application January 28, 1944, Serial No. 520,028

2 Claims. (Cl. 196—52)

1

This invention relates to contacting divided solid particles with fluids, and more particularly, relates to catalytic reactions in which powdered catalyst is used.

The invention is especially useful in processes involving organic reactions where burnable material is deposited on the catalyst particles and the catalyst particles must be regenerated before being used over again. For example, in the catalytic conversion of hydrocarbons, coke or carbonaceous material is deposited on catalyst particles and the coke or carbonaceous material is removed by burning in a regeneration zone. In certain reactions, such as the catalytic cracking of hydrocarbons, the regeneration zone or vessel is much larger than the reaction zone or vessel and the regeneration vessel is supported at a high level. A large amount of structural steel is required for this purpose.

According to the present invention, two or more regeneration vessels are used through which the spent catalyst passes in series or parallel. In this way the size of the regeneration vessels is decreased so that they can be combined into a common tower with the reaction vessel. By including all of the vessels in one tower, there is a saving in structural steel. Various modifications are shown.

In addition, improved grid members or distribution plates are included for use in certain of the reaction and regeneration vessels.

In the drawing,

Fig. 1 represents one form of the invention in which the catalyst particles overflow from one regeneration vessel to the other;

Fig. 2 represents another form of the invention in which regenerated catalyst particles are withdrawn from the bottom of the lower regeneration vessel;

Fig. 3 represents another form of the invention in which spent catalyst is passed to two regeneration vessels and partly regenerated catalyst is passed from one regeneration vessel to the other;

Fig. 4 represents another form of the invention in which the spent catalyst is passed to the lower regeneration vessel and then to the upper regeneration vessel with means provided for passing at least part of the regenerated catalyst from the second regeneration vessel to the first regeneration vessel;

Fig. 5 represents an enlarged cross-sectional view of the lower portion of a vessel provided with a grid member and sealing means therefor;

Fig. 6 represents a vertical cross-section of the lower portion of a vessel provided with another form of grid member;

Fig. 7 represents a vertical cross-section of the lower portion of a vessel in which the vessel is provided with a bottom draw-off and inlets for gaseous fluid and/or gaseous fluid mixed with powdered material; and Fig. 8 represents a vertical view, partly in cross-section, of the lower portion of a vessel with another form of distributing means used instead of a grid.

Referring now to the drawing, the reference character 10 designates a single housing in which are located a reaction vessel 12 and regeneration vessels 14 and 16. By providing two regeneration vessels, the size of the regeneration vessel is reduced and both regeneration vessels are placed in the same housing with the reaction vessel 12. The three vessels are of roughly the same diameter so that they can conveniently be supported one upon the other, but the diameters are not necessarily identical.

The reaction vessel 12 is shown as provided with divided catalyst or contact particles 18 having a level shown at 22. The solid particles are maintained in a dry fluidized condition by regulating the velocity of the vapors or gases passing upwardly through the mass of catalyst particles or contact particles, and in the dry fluidized condition the mass assumes many of the characteristics of a liquid.

Reactants which may be preheated vapors or a mixture of vapors and a liquid are introduced through line 24 provided with nozzles 26 for introducing the reactants into the body of the contact particles 18. Regenerated contact particles are introduced into the bottom of the reaction vessel 12 through line 26'.

Where hydrocarbons are being converted in the presence of powdered catalyst, the regenerated catalyst passing through line 26' is used to supply at least part of the heat of conversion. Where the hydrocarbons are in liquid form, a sufficient amount of hot regenerated catalyst particles is used to vaporize the hydrocarbons and also to supply the heat of conversion. In the catalytic cracking of hydrocarbons, any suitable catalysts may be used, such as acid-treated bentonites, synthetic silica alumina or synthetic silica magnesia gels, etc. In other catalytic conversions of hydrocarbons, suitable catalysts may be used, such as reforming catalysts, isomerizing catalysts, etc. When using powdered catalyst the catalyst has a size of about 200 to 400 mesh or finer.

The vapors passing upwardly through the mass of catalyst particles maintains the catalyst particles in fluidized condition. In the catalytic cracking of hydrocarbons with powdered catalyst, the fractionator bottoms comprise a slurry of refractory oil and catalyst particles. The refractory oil is not a good cracking stock and if it is recycled to the reaction vessel, it forms a large amount of coke. In the drawing it will be noted that the pipe 26' containing the regenerated catalyst opens into the bottom of the reaction vessel 12 below the level of introduction of the fresh reactant being passed through line 24 and nozzles 26. The refractory oil slurry is preferably introduced through line 28 into the bottom portion of the reaction vessel 12 so that it first contacts the very hot regenerated catalyst before the catalyst is mixed with the fresh reactant. In this way the refractory oil is cracked at a higher temperature and less coke is deposited on the catalyst particles. If desired, the refractory oil slurry may be directly introduced into line 26' below the valve 32.

The vaporous reaction products leave the dense catalyst mixture 18 and are passed through separating means 34 which is shown in the drawing as a cyclone separator, but other separating means may be used. The vaporous reaction products contain entrained catalyst particles which are separated from the reaction product vapors in the separating means 34. The reaction product vapors still contain a small amount of entrained catalyst particles when they leave the separating means 34 and this small amount of catalyst is scrubbed out when the reaction products are passed through line 36 to a fractionating system (not shown) for recovering desired products.

The separated catalyst particles collect in the bottom of the separating means and are returned to the mass of catalyst particles 18 through line 38 which extends below the level 22 of the catalyst mixture in the reaction vessel 12.

The catalyst particles become fouled or spent by the deposition of carbonaceous or burnable deposits on the catalyst particles and the activity of the catalyst particles is decreased. It is necessary to regenerate the catalyst particles by removing the carbonaceous deposits. For this purpose the reaction vessel 12 is provided with a partition 42 which extends across the bottom portion of the reaction vessel to form a well 44 from which spent catalyst is removed. The partition 42 extends up only for a relatively short distance, which is below the level 22 of the catalyst mixture in the reaction vessel 12.

Stripping gas is introduced through line or lines 46 into the bottom of the well 44 for removing adsorbed or occluded reaction products or reactants from the catalyst particles. The catalyst particles in the well 44 are maintained in a fluidized condition.

The spent catalyst particles pass through valve 48 and then into line 52 where they are mixed with regenerating gas introduced through line 54 to form a less dense mixture. The relatively dense catalyst mixture shown at 18 in the reaction vessel 12 has a density of about 10 lbs./cu. ft. to 35 lbs./cu. ft. when using powdered silica alumina gel as a catalyst. This fluidized mixture produces a hydrostatic pressure above valve 48 equivalent to a column extending from the valve 48 to the level 22. Also the reaction vessel 12 is under a slight superatmospheric pressure and this pressure, together with the hydrostatic pressure, is sufficient to move the catalyst particles to the upper regeneration vessel 16.

The less dense mixture is passed through line 56 to the regeneration vessel 16 below the distribution plate or grid 58 therein. The distribution plate or grid member serves to distribute the catalyst particles and regenerating gas across the area of the regeneration vessel. If desired, additional regenerating gas may be introduced through lines 62, 64, and 66 along the length of the upflow line 56.

The velocity of the regenerating gas fluidizes the catalyst particles undergoing regeneration so that there is a fluidized mass of catalyst particles 68 having a level 72 in the top regeneration vessel 16. A partition 74 is provided which extends across the housing 10 and forms one side of the top regeneration vessel 16. The space 76 above the fluidized mass of catalyst 68 is an enlarged space for separating catalyst particles from regeneration gases.

The partly regenerated catalyst particles overflow the top of the partition 74 as shown at 78 and pass to the lower regeneration vessel 14. The regeneration gases contain entrained catalyst particles, and to remove these particles, the regeneration gases are passed through a separating means 82 which is shown in the drawing as a cyclone separator, but other forms of separating means may be used. The separating means 82 is arranged in the upper portion of the housing 10. The separated catalyst particles collect in the separating means and are returned to the body of catalyst mixture 68 through return pipe 84 which dips below the level 72 of the fluidized mixture of catalyst particles 68.

The regeneration gases leaving the separating means 82 through line 86 still contain entrained catalyst particles and the regeneration gases may be passed through additional separating means. For example, the regeneration gases may be passed through a heat exchange device for recovering heat and the cooled regeneration gases then pass through an electrostatic precipitator. The heat exchange device may comprise a waste heat boiler.

The lower regeneration vessel 14 is provided with a grid member or distribution plate 88 below which regenerating gas is introduced through line 92. The partition 74 forming part of the first regeneration zone or vessel 16 stops a short distance above the distribution plate 88 in the lower regeneration vessel 14. It will be seen that a partition 94 is provided for separating the reaction vessel 12 from the lower regeneration vessel 14.

The lower portion of the partition 74 also forms part of the lower regeneration vessel 14. On the opposite side regeneration vessel 14 is provided with a partition 96 which extends across the vessel 14 and forms a wall for supporting or confining a body of fluidized catalyst particles as shown at 98 having a level at 102.

The partly regenerated catalyst particles pass from the top regeneration vessel 16 through down spout 104 formed by the partition 74 and the adjacent wall of the housing 10 to the second regeneration vessel 14. The gas velocity in vessel 14 is such that the catalyst particles undergoing further regeneration in the lower regeneration vessel 14 are maintained in a fluidized condition.

The regenerated catalyst particles overflow the smaller partition 96 into well 105 from which they flow into standpipe 106 and thence to the pipe 26' above described.

The regeneration gases leaving the relatively dense catalyst mixture 98 are withdrawn through line 106 and are passed to a second separating means 108 arranged in the upper part of the housing 10 adjacent the first separating means 82. The separating means 108 is shown in the drawing as a cyclone separator but other separating means may be used.

The regeneration gases passing through line 106' still contain entrained catalyst particles and most of these catalyst particles are separated in the separating means 108. The regeneration gases leave the separating means 108 through line 112 and may be treated in the same manner as those leaving the first separating means 82 through line 86.

The separated catalyst particles collect in the separating means 108 and are returned to the second regeneration vessel 14 through line 114 below the level 102 of the catalyst mixture therein.

Catalyst may be recovered from the regeneration gases leaving at 86 and 112 by passing through an electrostatic precipitator, or the gases may be scrubbed with liquid to recover catalyst particles therefrom.

In Fig. 1 the overflow principle is used in both regeneration vessels 14 and 16 and the second or lower regeneration vessel 14 operates at a somewhat higher pressure in order to utilize the vessel height for building up pressure on the catalyst. It will be seen that the fluidized catalyst particles overflow partitions when leaving each of the regeneration vessels 14 and 16.

In the form of the invention shown in Fig. 1, the level 22 of catalyst in the reaction vessel 12 is fixed by the amount of catalyst in the entire unit, that is, the inventory. The rate of circulation of catalyst through the unit is controlled by the amount and point of introduction of the conveying air. For example, for a relatively low rate of circulation a certain amount of regenerating gas is introduced through line 54. If it is desired to increase the rate of circulation, additional air may be introduced through any or all of the lines 54, 62, 64 and 66.

The valves 32 and 48 shown in Fig. 1 are ordinarily not used for controlling the amount of catalyst passing through the lines but are merely safety shut-off valves which may be closed in case the system becomes upset.

If desired, valve 48 may be used for setting the catalyst rate either manually or automatically. Also, by omitting the overflow from the last stage of regeneration shown at 14, or by lowering the height of partition 96, valve 32 may be used for controlling the amount of regenerated catalyst being passed to the reaction vessel 12. In this latter case, the level in regenerator 14 will be set by the amount of catalyst in the system as well as by the level of catalyst maintained in the reaction vessel 12. These levels will be suitably balanced by adding or removing catalyst from the system or unit.

When using the overflow principle, the amount of catalyst held in the regeneration vessels 14 and 16 will be substantially uniform and excess catalyst will flow into the reaction vessel 12. The level of catalyst in the reaction vessel 12 which affords one method of controlling the degree of reaction can be regulated by the amount of catalyst in the system or unit. Thus, if more reaction or conversion is desired, catalyst will be added to the system to build up the level of catalyst in the reaction vessel 12, and if less reaction or conversion is desired, catalyst will be removed from the system.

Referring now to Fig. 2, the reference character 150 designates a single housing in which are contained reaction vessel 152, a lower regeneration vessel 154 and an upper regeneration vessel 156. In this form of the invention the upper regeneration vessel 156 operates on the overflow principle but the lower regeneration vessel 154 does not operate on this principle. The regenerated catalyst particles are withdrawn from the body of the catalyst mixture 158 undergoing regeneration.

The apparatus shown in Fig. 2 is similar to that shown in Fig. 1 and it will be only briefly described but the differences will be emphasized. The reaction vessel 152 has a body of fluidized catalyst particles 162 with a level 164. The bottom of the reaction vessel 152 is formed by grid member 166. Hot regenerated catalyst from standpipe 168 is passed through slide control valve 172 to line 174 where it is mixed with reactants introduced through line 176. The reactants may be in vapor or vapor-liquid mixtures. A sufficient amount of hot regenerated catalyst is used to supply some of the heat of reaction and where the reactants are liquid, the hot regenerated catalyst also supplies heat of vaporization.

The reactants may comprise organic compounds. The invention is especially adapted for the catalytic conversion of hydrocarbons, such as the catalytic cracking of higher boiling hydrocarbons to produce lower boiling hydrocarbons. Other reactions may be used.

When partly preheated liquid hydrocarbons are introduced through line 176, the mixture of hot regenerated catalyst and resultant vapors are passed through line 178 into the reaction vessel 152 below the grid member 166 therein. A partition 182 is provided in the bottom portion of reaction vessel 152 to provide a well 184 from which the spent catalyst is withdrawn. Stripping gas is introduced through line 186. The stripped spent catalyst passes to standpipe 188 having a slide control valve 192. The spent catalyst then passes to line 194 where it is mixed with regenerating gas introduced through line 196 and the less dense mixture is passed through line 198 to the upper regeneration vessel 156 below grid member 199 therein.

In the form of the invention shown in Fig. 2, a level controller 202 is shown with suitable means 204 for controlling the control valve 192. As the level of catalyst shown at 164 varies in the reaction vessel 152, the control valve 192 is changed to maintain the level at a desired height.

The reaction products in vapor form pass through separating means 206 arranged in the upper part of the reaction vessel 152 for separating entrained catalyst particles from the reaction product vapors. The separated catalyst particles are returned thorugh line 208 to the body of catalyst 162, preferably into the well 184. The vapors leave the upper part of the separating means 206 and leave the unit through 212 for passage to suitable separating equipment such as a fractionating system. It will be seen that the lower regeneration vessel 154 is separated from the reaction vessel 152 by a horizontal partition 213.

Slurry oil comprising refractory oil containing catalyst particles may be introduced through line 214 directly below valve 172 in the lower part of standpipe 168. In this way the refractory oil first contacts exceedingly hot regenerated catalyst and less coke is deposited on the catalyst particles than if the refractory oil were introduced with the feed oil through line 176.

In the top regeneration vessel 156 the catalyst particles are partially regenerated. While the catalyst particles are in the regeneration vessel 156, they are maintained as a fluidized mixture 216 having a level shown at 218. The catalyst particles overflow vertical partition or baffle 222 and flow into spout 224 to the lower regeneration vessel 154. Regeneration gases leaving the upper regeneration vessel 156 are passed through separating means 226 having a return pipe 228. The gases pass overhead through line 232.

The lower regeneration vessel 154 has a grid member 234 spaced from the partition 213 and regenerating gas is introduced below the grid member through line 236. The fluidized catalyst particles in the lower regeneration vessel 154 comprise a mass of fluidized particles 238 having a level 242. A withdrawal well 244 is formed by a vertically arranged partition or baffle 246 in the lower regeneration vessel 154. It will be seen that the level 242 of catalyst particles is above the partition 246 and that the overflow principle is not used in this regeneration vessel 154. The regenerated catalyst particles are withdrawn from the lower portion of the body of catalyst particles 238 undergoing regeneration. From the well 244 the regenerated catalyst particles flow into standpipe 168 and then to the reaction vessel 152 as above described. Preferably the standpipe 168 is provided with fluidizing lines 248 for maintaining the catalyst particles in fluidized condition in the standpipe 168 so that they produce a hydrostatic pressure at the bottom of the standpipe.

The regeneration gases are withdrawn from the upper part of the lower regeneration vessel 154 and as they contain entrained catalyst particles, they are passed through line 252 into the upper part of the housing 150 above the upper regeneration vessel 156. The regeneration gases introduced through line 252 are also passed through the separating means 226.

In the form of the invention shown in Fig. 2, valves 172 and 192 are used to control the rate of withdrawal of catalyst from the reaction vessel 152 and the lower regeneration vessel 154. Valve 192 is used to control the level of catalyst in the reaction vessel 152. The level of catalyst in the lower regeneration vessel 154 varies with the amount of catalyst in the system and also with changes in the level in the reaction vessel 152. In Fig. 2 the regeneration vessels 154 and 156 are operated at substantially the same pressure so that the vent gases from both regeneration vessels may be mixed and treated in the same recovery apparatus.

If desired, a separating means, such as a cyclone separator, may be introduced into the lower regeneration vessel 154. Instead of passing all of the regenerated catalyst from the lower regeneration vessel 154 to the standpipe 168, if desired, a part of the regenerated catalyst may be withdrawn from the lower portion of the mass of catalyst 238 in the lower regeneration vessel 154, mixed with air and introduced into line 198 for recirculation to the upper regeneration vessel 156. This type of operation tends to bring the operating temperature of the two regenerators closer together which is desirable in certain cases. Lower regenerator 154 normally operates at a temperature somewhat higher than vessel 156 because most of the heat from the additional regeneration is absorbed by the catalyst entering at 224.

Referring now to Fig. 3, the reference character 280 designates a single housing which includes reaction vessel 282, lower regeneration vessel 284 and upper regeneration vessel 286. The reaction vessel 282 contains a mass of fluidized catalyst 288 having a level 292. The reaction vessel 282 has a bottom grid member 294 and a bottom draw-off well 296. Stripping lines 298 are provided for introducing stripping gas into the well 296. Regenerated catalyst in standpipe 302 is passed through control valve 304 and into line 306 where it is mixed with reactants, such as hydrocarbon oil, introduced through line 308. The mixture of catalyst and reactants is passed through line 312 and through the grid member 294.

The reaction products in vapor form pass through separating means 314 arranged in the upper part of the reaction vessel, and separated catalyst particles are returned through line 316 to the body of catalyst 288 in the reaction vessel. Reaction product vapors leave the separating means 314 through line 318 and are passed to suitable equipment, such as fractionating equipment, for separating desired product.

The spent catalyst particles are withdrawn from the well 296 through line 322 which branches into lines 324 and 326. Line 324 has a control valve 328 for controlling the amount of spent catalyst passing to line 332 where the spent catalyst is mixed with regenerating gas introduced through line 334. The less dense mixture is passed through upflow pipe 336 to the lower regeneration vessel 284 below the grid member 338 therein.

The spent catalyst in line 326 is passed through control valve 342 to line 344 where it is mixed with regenerating gas introduced through line 346 and the less dense mixture is passed through line 348 to the upper regeneration vessel 286 below the distribution grid 352 therein.

The catalyst particles undergoing regeneration in the lower regeneration vessel 284 are maintained as a mass 354 having a level shown at 356. The lower regeneration vessel 284 is separated from the upper regeneration vessel 286 by partition 358. The regeneration gases leaving the mass of catalyst 354 in the lower regeneration vessel 284 are passed through separating means 362 having a return pipe 364. The regeneration gases leave the separating means 362 through line 366.

In the upper regeneration vessel 286 the catalyst particles undergoing regeneration are maintained as a fluidized mass shown at 372 having a level at 374. The regeneration gases leaving the fluidized mixture are passed through a separating means 376 having a return pipe 378. The regeneration gases leave the separating means 376 through line 382. The regeneration or vent gases leaving the separating means in the lower regeneration vessel 284 through line 366 are preferably at a higher pressure than the vent gases leaving the upper regeneration vessel 286 through line 382.

The regenerated catalyst particles from the upper regeneration zone or vessel 286 are passed to the lower regeneration vessel 284 through standpipe 384 which has its upper end approximately at the level 374 in the upper regeneration vessel 286 and its lower end above the distribution plate or grid member 338 in the lower regeneration vessel 284. Standpipe 384 may be provided with a valve, if desired. While the standpipe 384 is shown as located inside the tower or housing 280, the standpipe may extend outside the housing, and may be fitted with a valve, if desired.

The regenerated catalyst from the upper regeneration vessel 286 overflows into the standpipe 384. Due to the intermixing or circulation provided by the standpipe 384, and by a proper choice of the distribution of catalyst flow between lines 324 and 326, the regeneration zones 286 and 284 may be operated at about the same temperature.

Regenerated catalyst is withdrawn from the lower regeneration vessel 284 by means of standpipe 302. The standpipe is preferably provided with fluidizing lines 392 for introducing fluidizing gas at spaced intervals along the length of the standpipe to maintain the particles in fluidized condition so that a hydrostatic pressure is built up at the base of the standpipe 302. In the form of the invention shown in Fig. 3, the spent catalyst is subdivided into two substantially equal parts and also substantially equal amounts of air or regenerating gas are used for passing the spent catalyst to the respective regeneration vessels.

Referring now to Fig. 4, the reference character 420 designates a single tower or housing which includes reaction vessel 422, lower regeneration vessel 424 and upper regeneration vessel 426. The apparatus shown in Fig. 4 is similar to that shown in Fig. 3 and the apparatus will be generally described in connection with similar parts and will be described in greater detail to point out differences between the two apparatuses.

Reaction vessel 422 has a body of catalyst 428 with a level 432. The vessel 422 has a grid member 434 and a withdrawal well 436 into which stripping gas is passed through lines 438. A separating means 442 is provided having a dip pipe 444 and an outlet line 446 for reaction product vapors. Spent catalyst is withdrawn from the well 436 by means of standpipe 448 having a control valve 452. The spent catalyst is mixed with a regenerating gas introduced through line 454 and the less dense mixture is passed through line 456 to the lower regeneration vessel 424 below grid member 458 therein.

Lower regeneration vessel 424 has a body of catalyst 462 having a level 464. The regeneration vessel 424 is provided with separating means 466 having a return pipe 468 and an outlet for vent gases 472. Partition 474 separates the lower regeneration vessel 424 from the upper regeneration vessel 426.

A withdrawal well 476 is provided in the lower portion of the lower regeneration vessel 424 by a partition or baffle 478 and fluidized partly regenerated catalyst flows into line 482 having control valve 484. Partly regenerated catalyst passing through valve 484 is mixed with regenerating gas introduced through line 486 and the mixture passed through line 488 to the upper regeneration vessel 426 below grid member 492 therein. The catalyst in the upper regeneration vessel 426 is in a fluidized condition as shown at 494 having a level at 496. The upper regeneration vessel 426 has a separating means 498 provided with a return pipe 502 and an outlet 504 for vent or regeneration gases.

The upper regeneration vessel 426 has a withdrawal well 506 formed by partition 508 for withdrawing regenerated catalyst particles from the lower portion of the mass of catalyst particles 494. The regenerated catalyst particles flow into standpipe 512 wherein they are maintained in a fluidized condition by the introduction of fluidizing gas through lines 514 arranged at spaced intervals along the standpipe 512. The standpipe is provided with a control valve 516 at its lower end for controlling the rate of flow of regenerated catalyst particles to line 518. Reactants in vapor or liquid form are introduced into line 518 through line 522 and the mixture is passed through grid member 434 into the reaction vessel 422.

In the form of the invention shown in Fig. 4, a standpipe 524 is provided which is similar to standpipe 384 described in connection with Fig. 3. Standpipe 524 provides for a circulating catalyst between the regeneration vessels 426 and 424. With this recirculation of catalyst, the temperature during regeneration in the two vessels 424 and 426 is maintained substantially the same.

The vent gases from the regeneration vessels shown in Figs. 3 and 4 may be cooled and passed through electrostatic precipitators as described in connection with Fig. 1. Or the vent gases may be scrubbed with a scrubbing liquid, such as oil or water, for removing entrained catalyst particles therefrom.

In the case of down spouts 104, 384, etc., and dip pipes 84, 378, etc., it is preferred to omit the holes in the distributor plate immediately below the down spout or dip pipe.

The apparatus shown in the drawings may be applied to various catalytic reactions, such as cracking, retreating, dehydrogenation, aromatization, etc. Other processes involving the reaction of organic compounds other than hydrocarbons may also be used.

The grid members disclosed in Figs. 5 to 8 inclusive will now be described.

In present fluid catalyst plants the grid member in the bottom of the reaction vessel is horizontal and is located at the top of the lower cone of the reactor or regenerator. With large diameters and severe operating conditions the problem of supporting the grid is quite difficult. The weight of the steel involved and the supporting members is considerable. In addition, the problem of expansion and contraction due to changes in temperature arises. It is necessary to have a good seal between the edge of the grid member to prevent by-passing of the gas or the suspension around the edges of the grid member. It is necessary that the gas or the suspension pass through the holes in the grid member.

In Fig. 5 I have shown the lower portion of a vessel which is not an exact duplicate of the reaction vessel shown in Fig. 1 but is substantially the same as some of the vessels shown in the other figures. The vessel 540 has a line 542 for withdrawing catalyst in a relatively dense condition. This corresponds to the well 184 in Fig. 2. The grid member 544 corresponds to the grid member 166 in Fig. 2. Inlet 546 corresponds to the inlet 178 in Fig. 2. In order to provide a sealing means for the edge of the grid member 544, I provide a ring 548 which is attached to the edge of grid member 544 and forms a flange therefor. The ring is concentric with the vessel and extends to a point above the cone bottom 552 as shown at 554. Another ring 556, smaller in diameter, is attached to and extends upwardly from the cone bottom 552 to a level below that of the grid member 544. The rings 548 and 556 provide a well 558 for holding a fluidized powdered material which acts as a seal. The fluidized powdered material in well 558 has a level 559. The fluidized powdered material is part of the fluidized mixture generally indicated at 560. Aerating lines 562 and 564 are provided for introducing an aerating gas into the sealing well 558.

Ring 548 is provided with an opening 566 near its lower end and smaller ring 556 is provided with an opening 568 near its lower end. These holes are provided to minimize or eliminate the aeration through lines 562 and 564. The openings 566 and 568 may be omitted if desired.

Supporting members 570 and 572 are shown for supporting the grid member from the cone-shaped bottom 552 of the vessel. Members 570 and 572 are secured at one end to bottom 552 by pins or the like as shown at 574. The other ends of members 570 and 572 are secured to the grid member 544 at spaced points.

A simpler construction is shown in Fig. 6 wherein the vessel 580 is provided with the same type of sealing means 582 described in connection with Fig. 5. A bottom inlet 584 for gas or gaseous suspension is provided. In this form of the invention the grid takes the form of an inverted perforated cone 586 placed inside and spaced from the bottom cone 588 of the vessel 580. The bottom portion 590 of the cone 586 is imperforate. The perforated cone 586 is supported from the bottom cone 588 of the reaction vessel by bolts 592, or other members.

The vessel contains a fluidized mixture generally indicated at 594. As the outer openings 596 in the perforated cone member 586 are at a higher level than the inner openings 598, the fluid head or hydrostatic pressure above the outer holes 596 will be less than that over the inner holes 598. Therefore, if the holes were all of the same size and equally spaced, there would be a tendency for more gas to pass through the outer holes 596. However, by proper design, this tendency can be corrected as, for example, the number of holes per square foot of cross-sectional area may be decreased where the static head or pressure is lower or the size of the holes can be reduced at the outer portions of the cone member to give the desired distribution of flow. The fluidized material in the sealing well has a level 599.

The modification shown in Fig. 7 is substantially the same as that shown in Fig. 6 except that a bottom drawoff tube 600 is provided in the vessel 602 for withdrawing dense fluidized solid material 604 from the vessel 602. Inlet lines 606 are provided for introducing gas or gaseous suspension below the grid member 608 which is similar to that shown in Fig. 6 with the central portion cut away to permit introduction of the withdrawal tube 600. Also the vessel has a bottom outlet 610.

In Fig. 8 the vessel 612 has a bottom inlet 614. The grid member 616 is in the form of distribution rings. The larger upper ring 618 is provided with a plurality of openings 620 and is arranged to rest on the upper portion of the bottom cone 622 of the vessel 612. The next lower ring 624 is smaller and rests on the bottom cone 622 of vessel 612 at a lower level. The smaller ring 624 is also provided with a plurality of openings 626.

The gas or gaseous suspension introduced through line 614 passes upwardly through line 628 to the lower ring member 624 and then through pipe 630 to the upper ring member 618. The gas or gaseous suspension passes through openings 620 and 626 in the ring members.

Instead of the distributing means shown in Figs. 5 to 8, a plurality of perforated tubes generally parallel to the bottom cone of the vessel may be used for distributing gaseous fluids to the bottom of the vessel.

When the apparatus shown in Figs. 1 to 4 inclusive is used for catalytic conversion of hydrocarbons, the temperature during conversion may be between about 750° F. and 1100° F. and the catalyst to oil ratio by weight when using powdered synthetic silica alumina gel catalyst (200–400 mesh) may vary from about 1 part of catalyst to 1 part of oil to 30 parts of catalyst to 1 part of oil, depending on the temperature of the oil, the amount of conversion desired, the activity of the catalyst, etc. The temperature during regeneration is about 1000° F. to 1175° F. depending on the catalyst used.

While I have shown several modifications of my invention, it is to be understood that these are by way of illustration only and various changes may be made without departing from the spirit of my invention.

I claim:

1. A process for contacting solid particles with gaseous fluid which comprises introducing fluid and solid particles into a contacting zone, maintaining the particles in said contacting zone in fluidized condition, withdrawing solid particles from the bottom portion of said contacting zone and passing gaseous fluid overhead from said contacting zone, mixing portions of withdrawn solid particles with separate streams of regenerating gas and passing the separate streams to separate regeneration vessels arranged one above the other in the same housing which contains said contacting zone, passing solid particles from an upper regeneration zone to a lower regeneration zone and then to said contacting zone.

2. A process according to claim 1 wherein the solid particles are maintained in a relatively dense fluidized condition in each of said regenerating zones and the solid particles are withdrawn from each of said zones as a relatively dense fluidized mixture.

CHARLES E. JAHNIG.

REFERENCES CITED

The following references are of record in the file of this patent:

UNITED STATES PATENTS

| Number | Name | Date |
| --- | --- | --- |
| 1,770,107 | Kulzinski | July 8, 1930 |
| 1,851,069 | Thayer | Mar. 29, 1932 |
| 2,014,941 | Lee | Sept. 17, 1935 |
| 2,270,903 | Rudbach | Jan. 27, 1942 |
| 2,304,128 | Thomas | Dec. 8, 1942 |
| 2,311,564 | Munday | Feb. 16, 1943 |
| 2,273,076 | Voorhees | Feb. 17, 1942 |
| 2,331,433 | Simpson et al. | Oct. 12, 1943 |
| 2,341,193 | Scheineman | Feb. 8, 1944 |
| 2,353,495 | Payne | July 11, 1944 |
| 2,367,281 | Johnson | Jan. 16, 1945 |
| 2,372,018 | Ruthruff | Mar. 20, 1945 |
| 2,389,399 | Alther | Nov. 20, 1945 |